United States Patent
Pyles

(10) Patent No.: US 12,435,691 B2
(45) Date of Patent: Oct. 7, 2025

(54) COMPRESSION RECOVERY DEVICE FOR DELIVERING ELECTRICITY IN PIPELINE SYSTEMS

(71) Applicant: Eric D. Pyles, Huntington, WV (US)

(72) Inventor: Eric D. Pyles, Huntington, WV (US)

(73) Assignee: Eric Pyles, Huntington, WV (US)

( * ) Notice: Subject to any disclaimer, the term of this patent is extended or adjusted under 35 U.S.C. 154(b) by 0 days.

(21) Appl. No.: 18/679,693

(22) Filed: May 31, 2024

(65) Prior Publication Data
US 2024/0418142 A1 Dec. 19, 2024

Related U.S. Application Data

(60) Provisional application No. 63/508,354, filed on Jun. 15, 2023.

(51) Int. Cl.
*F03B 13/08* (2006.01)
*H02K 7/116* (2006.01)
*H02K 7/18* (2006.01)

(52) U.S. Cl.
CPC .............. *F03B 13/08* (2013.01); *H02K 7/116* (2013.01); *H02K 7/1823* (2013.01); *F05B 2220/20* (2013.01)

(58) Field of Classification Search
CPC ....... F03B 13/08; H02K 7/116; H02K 7/1823; F05B 2220/20
See application file for complete search history.

(56) References Cited

U.S. PATENT DOCUMENTS

| | | | |
|---|---|---|---|
| 11,542,909 B1* | 1/2023 | Andersson | H02K 7/1823 |
| 2010/0133834 A1* | 6/2010 | Nimberger | H02K 7/20 |
| | | | 320/101 |
| 2015/0369258 A1* | 12/2015 | Sakamoto | H02K 5/203 |
| | | | 415/121.3 |

FOREIGN PATENT DOCUMENTS

RU 2386818 C2 4/2010

* cited by examiner

*Primary Examiner* — Sean Gugger
(74) *Attorney, Agent, or Firm* — Eschweiler & Potashnik, LLC

(57) ABSTRACT

A compression recovery device is disclosed herein that is particularly suitable for generating electric power at a remote pipeline location. The device includes an inlet configured for coupling to a pipeline of a pipeline system and an outlet configured for coupling to a pipeline of the pipeline system. The device includes a turbine including turbine blades set in a turbo housing a hollow passage of which is coupled to the inlet and the outlet. The hollow passage configured to route fluid flow to the side of an axis about which the turbine blades of the turbine spin. The turbine is coupled to an alternator through one or more couplings that extend above and away from the turbine, the alternator configured to output electricity upon spinning of the turbine blades caused by flow of fluid through the pipeline.

20 Claims, 5 Drawing Sheets

COMPRESSION RECOVERY DEVICE FOR DELIVERING ELECTRICITY IN PIPELINE SYSTEMS

CROSS-REFERENCE TO RELATED APPLICATIONS

This application claims the benefit of priority to U.S. provisional application No. 63/508,354, filed on Jun. 15, 2023. This prior application is incorporated herein by reference.

FIELD

The technology disclosed herein relates to an energy recovering device for generating electrical power, in particular for a pipeline substation in a remote location.

BACKGROUND

Gas and oil pipelines are used to transport natural gas from production areas to consumption areas There are many processes and devices that require the reduction in pressure of natural gas in a pipeline. These processes and devices often require auxiliary energy sources to accomplish the primary goal of the process. Often times the need for energy to power these processes and devices is at a remote location without access to the electrical power grid.

Pipeline energy recovery devices have been developed for powering sensors (e.g., pressure, contamination, temperature), computing equipment (voltage or valve controllers, etc.), valve motors, and other devices along the pipeline in remote locations. However, these devices have a number of drawbacks. For example, many devices run on pneumatic pressure from gas-line fluid. This inevitably results in the release of fluids deemed to be environmentally harmful, such as methane. Other devices utilize solar power generated from solar cells and batteries. However, solar cells and batteries are expensive to install and maintain, and can be unreliable, due to cloud cover or snow coverage in remote locations.

Turbo expander devices can be employed perform processing on raw natural gas and can help recover some of the pressure energy lost and/or convert it to another energy source. Current turbo expanders are offered in a large-format assembly; meant to recover large amounts of energy at a primary facility. These devices are not associated with pipelines and would be impractical for use throughout the production, gathering and transportation side of the natural gas industry.

Other devices have made use of electric generators to convert pressure into electric power, however, such devices have been unsuitable for use in remote pipeline applications for various reasons, such as, suffering from overall inefficiency or producing unwanted heat generation.

Thus, there is a need for an alternative power solution that is configured for use in a remote hydrocarbon pipeline or substation facility without the drawbacks of prior devices.

SUMMARY

The compression recovery device disclosed herein seeks to "redeploy" the energy recovered from pressure reduction so that the processes and devices at the remote area or substation facility can be powered without the need for auxiliary or secondary energy sources.

The following is a brief summary of subject matter that is described in greater detail herein. This summary is not intended to be limiting as to the scope of the claims.

In some aspects, the techniques described herein relate to a compression recovery device for use in a pipeline system including: an inlet configured for coupling to a pipeline of the pipeline system and an outlet configured for coupling to a pipeline of the pipeline system; a turbine including turbine blades; a turbo housing coupled to the inlet and the outlet and including a hollow passage configured to route fluid flow to a side of an axis about which the turbine blades of the turbine spin; the turbine coupled to an alternator through one or more couplings that extend away from the pipeline, the alternator configured to output electricity upon spinning of the turbine blades caused by flow of fluid through the pipeline.

In some aspects, the techniques described herein relate to a pipeline system including: a compression recovery device including: an inlet configured for coupling to a pipeline of the pipeline system and an outlet configured for coupling to a pipeline of the pipeline system; a turbine including turbine blades; a turbo housing coupled to the inlet and the outlet and including a hollow passage configured to route fluid flow to a side of an axis about which the turbine blades of the turbine spin; the turbine coupled to an alternator through one or more couplings that extend above and away from the pipeline, the alternator configured to output electricity upon spinning of the turbine blades caused by flow of fluid through the pipeline; and an upstream pipeline coupled to the inlet and a downstream pipeline coupled to the outlet; an electric powered device coupled to the compression recovery device.

In some aspects, the techniques described herein relate to a method of generating electric power at a remote pipeline location, including the steps of: spinning a turbine with fluid flow through a turbo housing; converting the spinning of the turbine to electrical power without causing an eddy current acting on the turbo housing; sending the electrical power to power one or more devices selected from: a sensor, a motor to power a valve opening and closing, a pre-heater, or computing equipment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
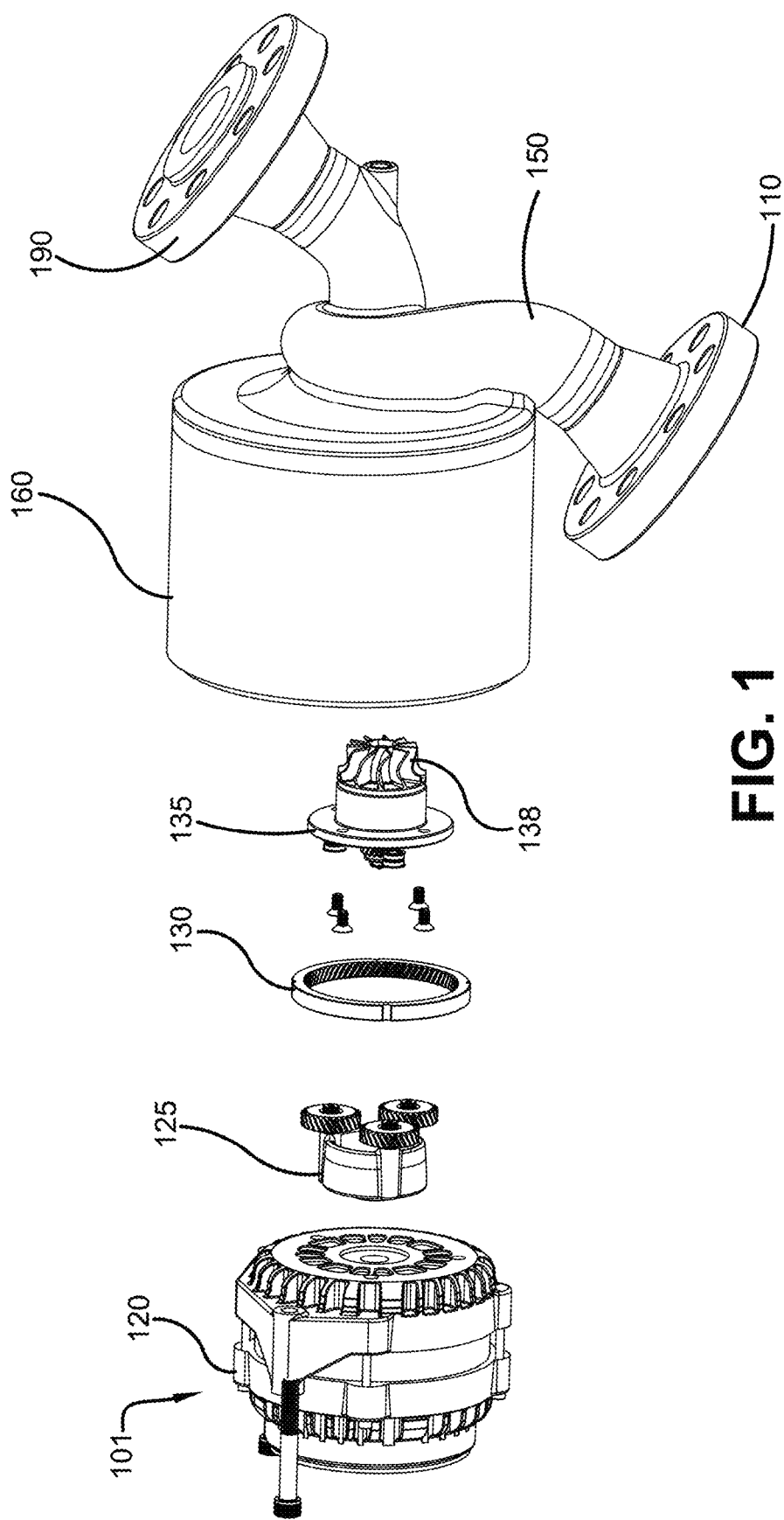
FIG. 1 is a partial-exploded view of an embodiment of a compression recovery device.

Various technologies pertaining to a pipeline compression recovery system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

While this disclosure focuses on gas, particularly natural gas pipelines and flows, the teachings herein can also be applicable to other fluid systems and flows, for example, liquid petroleum or kerosene.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference. In addition, the terms "inner" and "outer" are in reference to the longest axis of the devices and systems disclosed herein. The term "fluidly coupled" means a fluid, such as oil, can flow through from one end of the area it relates to, to another. For example, X is fluidly coupled to Y, means fluid can flow through tubing or some channel or chamber from X to Y or vice versa.

A compression recovery system is disclosed herein that can be installed in a pipeline system at a remote location, such as a substation facility, or any location where power is needed for sensors, valves, or other devices along the pipeline. In particular, the compression recovery system can be located where a drop in pressure of the incoming fluid is desired, since the reduction in pressure can synergistically combine with the need for conversion to electrical power. Pressure reduction is performed in: fuel gas settings found in compressor stations, processing facilities, interconnects, city gate facilities where gas is delivered to a local utility from a midstream or transmission pipeline, upstream processes in cryogenic facilities, and multiple processes within cracker plants.

In an embodiment, the compression recovery device would be installed in a bypass around an existing pressure reduction pipeline facility. A particulate filter would be installed upstream of the device to protect the device internals from stream-borne debris. A control valve would be installed downstream of the filter to control the rate of flow into the device as a form of over-spin protection.

An embodiment of a compression recovery device 101 is now described with reference to FIG. 1. In FIG. 1, an inlet 110 is configured for attaching to a pipeline. The inlet 110 is configured to receive fluid flowing into it from outside the device 101. The inlet 110 is coupled to a spiral turbo housing 150, which in turn is coupled to an outlet 190. The inlet 110 and outlet 190 may be for example, ANSI 600 flanges. The turbo housing 150 may be in the shape of a spiral and comprises a fluid pathway that spirals around a central, angled internal turbine 138. Other geometries may be used other than a spiral so long as fluid is forced through a hollow channel to the side of the axis of spinning of the turbine 138.

An upper housing 160 encapsulates various components of the compression recovery device 101 other than the inlet 110, outlet 190, and spiral turbo housing 150.

A turbine 138 is rotatably mounted to the turbine carrier 135. The turbine 138 includes a plurality of blades, such as, for example, 2 to 25, 3 to 12, or 4 to 8. When assembled, the turbine 138 is housed at or near the center of the angled spiral turbo housing 150, and is configured to be spun by the pressurized fluid flowing through it by rotating the blades The turbine 138 is coupled to an alternator 120 through one or more couplings that extend above (or to any side of) and away from the turbo housing 150 and fluid flow. A gear on the turbine carrier 135 opposite the turbine 138 is coupled to a planetary gear reduction assembly 125. A ring gear 130 is coupled to the outside of the planetary gears of the planetary gear reduction assembly 125. This planetary gear reduction assembly 125 functions to reduce the rpms of the turbine 138 to match the input specifications of the alternator 120 to which it is coupled. For example, the planetary gear reduction assembly 125 can step down the rpms by a factor of 2 to 10, such as 3 to 8, or 4 to 6. In an embodiment, the planetary gear reduction assembly 125 can step down the input rpms from the turbine 138 by a factor of 5.

The alternator 120 is of a typical design and can convert the mechanical rotary motion to produce electrical power. The alternator may be configured to receive rpm input at 1,000 to 12,000 rpm, such as, for example 2,000 to 10,000 rpm, or 3,000 to 8,000 rpm. In an embodiment, electric power generated from the compression recovery device is 1 kilowatt to 50 kilowatts, such as for example, 5 kW to 40 kW, or 10 kW to 35 kW.

In an embodiment, fluid at the inlet 110 has a flow of 500 mcf/day or more in flow, such as 1000 mcf/day or more, or 10,000 mcf/day or more. For example, at 500 mcf/day on a typical pipeline, the pressure at the outlet 190 will be about 100 PSIG (pounds per square inch gauge) and inlet pressure will be about 200 PSIG at the inlet to get a minimum turbine speed. The turbine speed may, for example, be 55,000 rpm and up, such as 60,000 rpm to 100,000 rpm, or 60,000 rpm to 70,000 rpm. Pressure loss through the turbine (or pressure differential measured at the inlet and outlet, may be, for example, in various embodiments, 25% to 90%, such as 40% to 70%, or 45% to 55%. In an embodiment, the diameter of the inlet 4 inches or less, such as ½ inch to 2 inches, for example, 0.75 inch to 1.75 inches, or 1 inch to 1.5 inches, and the diameter of the outlet is 4 inches or less, such as, 1 inch to 4 inches, for example, 1.5 inches to 3.5 inches, or 1.75 inches to 3 inches. The ratio of diameters can be 1:1 to 1:2, such as, for example, 1:1.5 to 1:1.85, or 1:25 to 1:1.75. These values may be pre-determined and designed to obtain the desired outlet flow velocity.

In an embodiment, the alternator can be coupled to a voltage regulator to adjust the power output and act as a guard reduce the voltage if there if the turbine 138 is spinning too fast. An upstream valve with a bypass can also be used to reduce pressure at the inlet 110 to prevent overspinning.

In an embodiment, the throat diameter of the inlet 110 will be sized to cause the pressure drop, i.e., larger than the pipeline feeding it. The throat diameter determines the amount of differential pressure that is generated. The objective is to produce a fluid stream that moves at an optimal velocity for the turbine 138. One or more valves can also be used to change the pressure and fluid velocity through the turbine 138.

The drop in pressure also causes the temperature of the fluid to drop from the inlet 110 to the outlet 190 substantially; for example, by 10 to 40 degrees F., such as 15 to 35 degrees F., or 20 to 30 degrees F. This cooled fluid can be recirculated via a bypass pipe and optional valve leading into the upper housing 160 or an exterior housing for cooling the heat-generating, spinning components and the alternator 120. In an embodiment, the bypass pipe would be coupled to an upstream port 111 (See FIG. 2) and the bypass pipe would be routed to the upper housing 160 as well as the downstream port 112 (See FIG. 2). The upstream port 111 and downstream port 112 would be connected to an upper housing 160 in a configuration that would promote displacement of the gas volume to accommodate fluid changes; effectively cooling the components. For example, by piping a portion of the higher pressure gas flowing in the inlet side into the larger volume of the upper housing 160 the pressure will drop and cause a cooling effect.

In another embodiment, a heat transfer device can be used for cooling instead of or in addition to the gas recirculation. The upper housing 160 is configured to be air tight to prevent off-gassing. In an embodiment, a separate exterior housing covers the components of the compression recovery device 101. This exterior housing can be air-tight except for a bypass pipe to receive cooling flow as discussed below.

The compression recovery device 101 produces a fluid output through the outlet 190 that is reduced in pressure from the inlet 110, and electrical power that can be used to power various valves, sensors, and other devices at the location.

In an embodiment, the alternator and other magnetic components are separated sufficiently from the turbo housing 150, such that little or no magnetic flux interacts with (extends to or exerts force on) the turbo housing 150 and upper housing 160. This prevents induction causing of eddy current, which would reduce efficiency and create excess heat in the turbo housing 150 or turbine 138 or other components of the compression recovery device 101.

Figure 2:
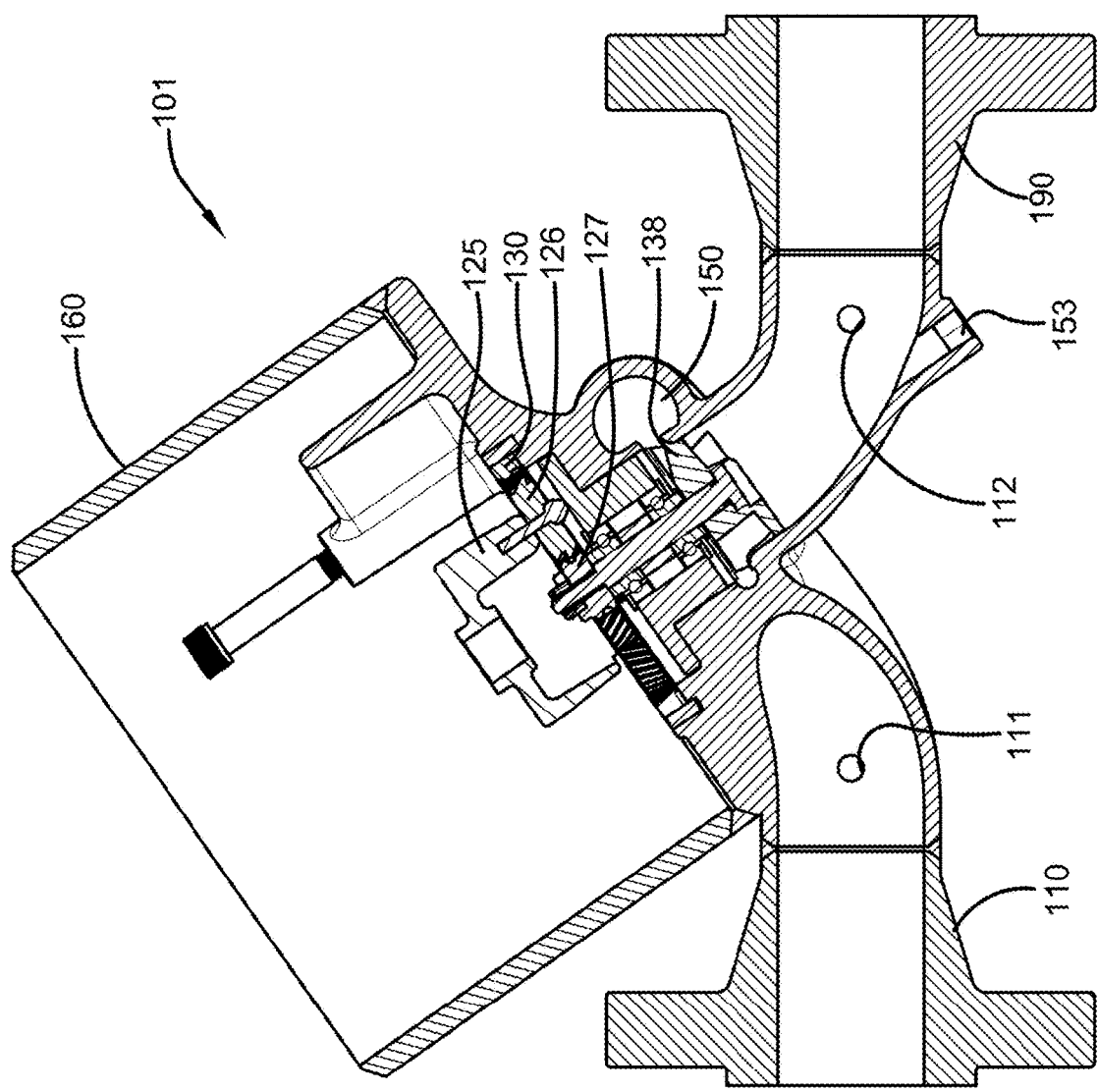
FIG. 2 is a cross-sectional view of the embodiment of the compression recovery device.

FIG. 2 is a cross-sectional view of an embodiment of the compression recovery device 101. Details of the internal components assembled in the upper housing 160 and in the spiral turbo housing 150 are shown, except for the alternator 120. The planetary gear reduction assembly 125 is shown coupled to the turbine 138 via the planetary gear 126, sun gear 127, and ring gear 130. Also shown is a service valve 153. Upstream port 111, downstream port 112, and a service valve 153, near the downstream port 112 are also shown on the turbo housing 150.

Figure 3:
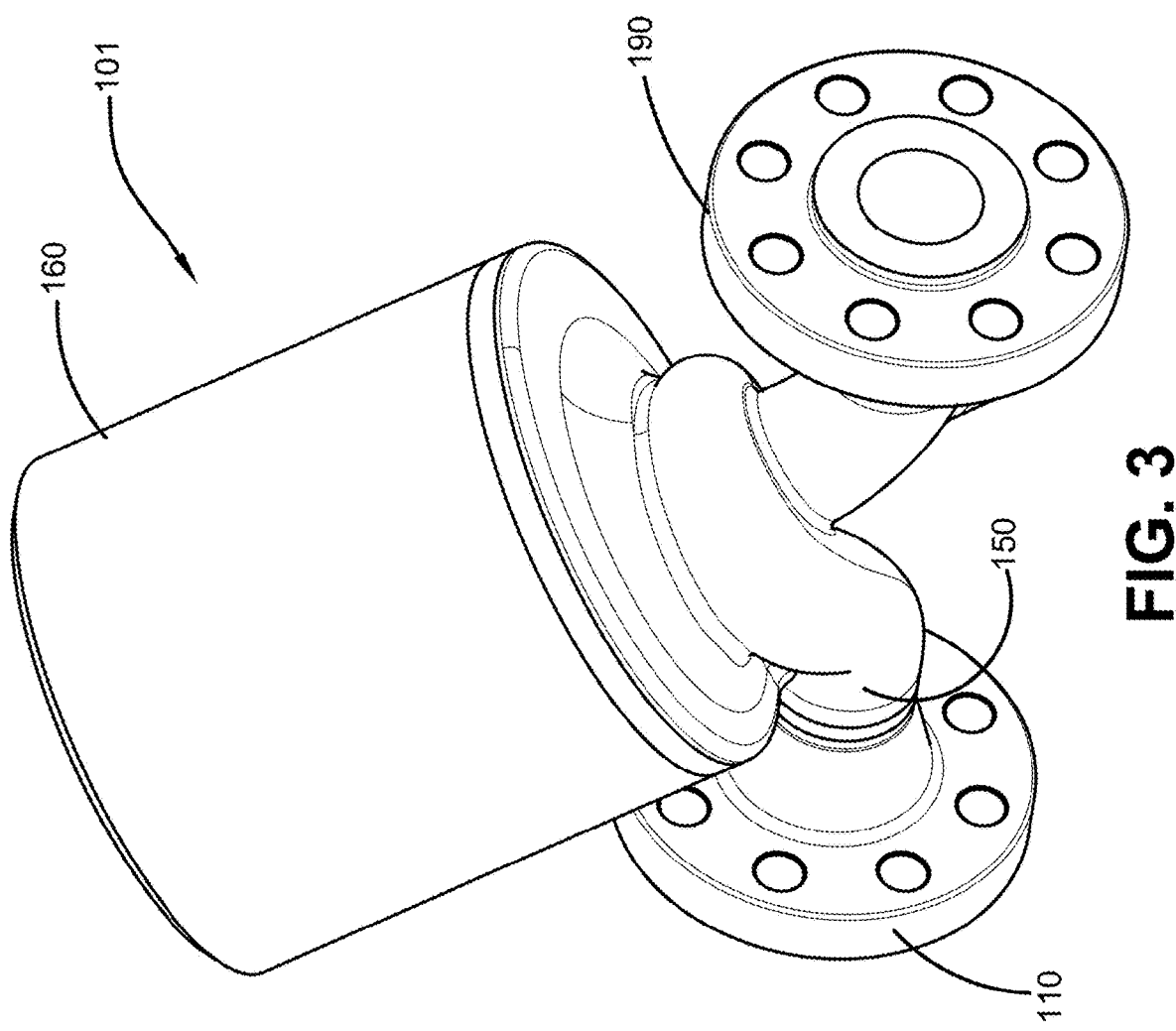
FIG. 3 is a perspective view of the embodiment of the compression recovery device fully assembled.

FIG. 3 is a perspective view of the embodiment of the compression recovery device 101 fully assembled.

Figure 4:
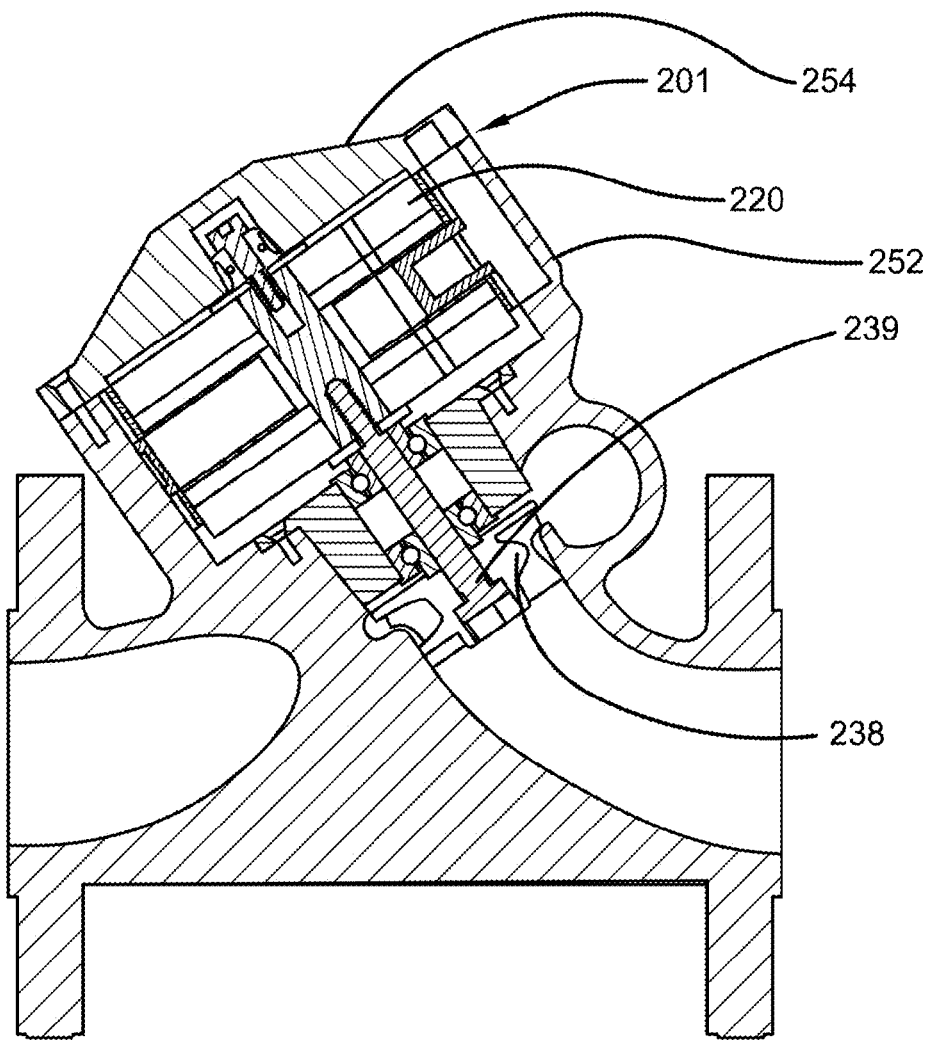
FIG. 4 is a cross-sectional view of a compact embodiment of a compression recovery device.

FIG. 4 is a cross-sectional view of a compact example of a compression recovery device 201. In this embodiment, the alternator is designed to operate at higher rpm than the embodiment of FIGS. 1-3, so it can be directly coupled to the turbine 238 (compare turbine 138 of FIG. 1) without any step-down gearing. Internal components are the same as those shown in FIGS. 1 and 2 except in this version the turbine 238 is directly coupled to the alternator 220, through a shaft 239 without the intervening gearing to step down the rpms. The upper housing 252, which is more compact in this embodiment, is covered by a lid 254. The turbo housing 250 encloses the turbine 238. This compact compression recovery device 201 can be configured to fit in place of a standard ANSI ball valve, such as for example, a 2" ND ANSI 150 ball valve.

Figure 5:
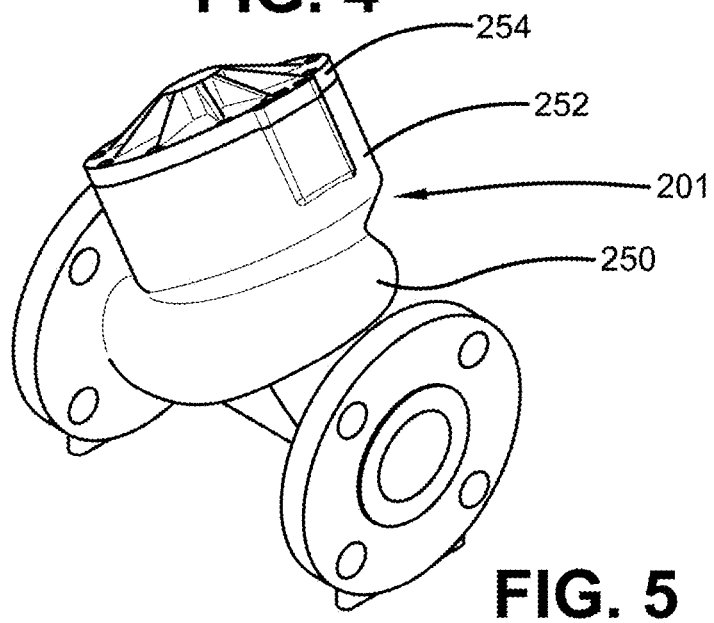
FIG. 5 is a perspective view of the compact embodiment of the compression recovery device.

FIG. 5 is a perspective view of the assembled compact example of the compression recovery device 201 of FIG. 4.

Figure 6:
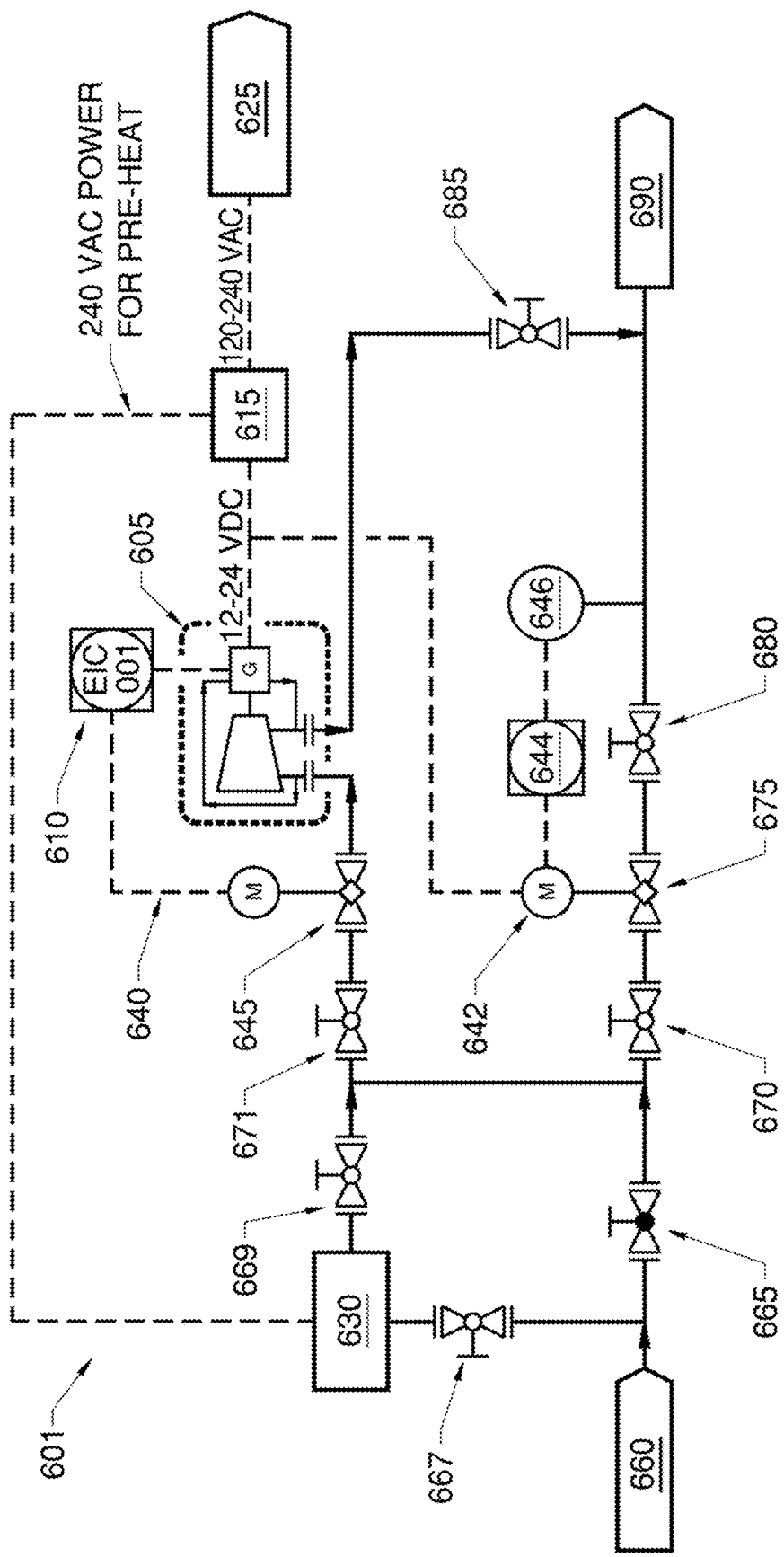
FIG. 6 is a diagram of an exemplary system for compression recovery and powering various devices at pressure drop location.

FIG. 6 is a diagram of an exemplary system 601 for compression recovery and powering various devices at a pressure drop location. Solid lines in FIG. 6 indicate pipelines. Broken lines indicate electrical connections. An embodiment of the compression recovery device 605 is at the center of the diagram. The compression recovery device 605 provides electrical current to the system 601 as described above. A voltage controller 610 is coupled to the compression recovery device 605 and regulates the voltage of the current output the compression recovery device 605 by varying the fluid flow into the inlet of the compression recovery device 605. The voltage may be regulated, for example, from 10 to 28 volts, such as, for example, 12 to 24 volts, or 14 to 22 volts.

Voltage controller 610 is a PID control device that monitors the voltage generated by the compression recovery device 605. If the PID setpoint is, for example, 14 VDC, the voltage controller 610 will modulate the primary voltage control valve 645 to adjust the fluid flow to turn the turbine in the compression recovery device 605 to hit the PID setpoint target. In an embodiment, the percentage that the primary voltage control valve 645 is open is directly proportional to the compression recovery device 605 voltage output. For example, if the target is 14 VDC and the compression recovery device 605 output is 13 VDC, the voltage controller 610 will increase the open percentage of the primary voltage control valve 645.

In an embodiment, the components of the compression recovery device 605 are those as described above, and include a turbo device and an electric generator. In an embodiment, the compression recovery device 605 includes a housing over all the components that is air-tight, so as to prevent unwanted methane or other fluid leaks into the environment.

An inverter 615 is coupled to the compression recovery device 605 and functions to change the electric input from direct current to alternating current for desired applications. For example, if there is excess electric power, the inverter output of AC current at, for example, about 120 to about 240 VAC, can be sent to an electric grid 625. If no electric grid 625 is available, excess electric power can be stored in one or more batteries (not shown). In an embodiment, the compression recovery device 605 can be located remotely at a location where an electric grid connection is unavailable, for example, the nearest power line may be more than 100 feet or more away, such as more than 1000 feet, or more than 1 mile away.

A pre-heater 630 is another application that uses AC power. The inverter 615 may thus be electrically coupled to a pre-heater 630 that is located in the system 601 before a pressure drop takes place. Pre-heating the gas before the pressure drop helps prevent the gas becoming too cold after the pressure drop and subsequent freezing of valves and/or other system components or unwanted condensation.

Direct current can also be applied in the system 601. For example, the compression recovery device 605 can send current to various motors (e.g., motor 640) to control valves on the system 601. In this embodiment, the current to the motor 640 acts to open or close the primary voltage control valve 645. The primary voltage control valve 645 is used to regulate the flow speed of the fluid flowing through the inlet of the compression recovery device 605 to prevent overspinning of the turbine and/or alternator. This regulation may be done to achieve a predetermined target voltage or to prevent heat and friction damage to the compression recovery device 605 due to the turbine spinning too fast, or to prevent excessive voltage being produced from the alternator.

In the depicted embodiment, another electric motor 642 is electrically coupled to the compression recovery device 605 and controls a primary pressure control valve 675 in the system 601. An electric motor 642 can also be used to open up other lines 644 in the system 601. The other lines 644 component would be employed in a station where fluid flow requirements are higher than power generation requirements. For instance, a remote station may flow enough gas to produce 500 kW of electricity, but the electric devices associated with the station needs 20 kW to operate. Without a grid presence, this additional potential power could not be accessed or used. In this situation, one or more compression recovery devices would be installed to fulfill the power requirements of the station. Then the rest of the fluid/gas would be sent through other lines 644 through a typical pressure regulator-like primary pressure control valve 675.

With respect to fluid/gas flow, high pressure gas flow comes in from the inlet 660 and the pipeline branches to a mainline valve 665, which, as depicted, is closed, and a bypass line valve 667. Bypass line valve 667 leads to the pre-heater 630 and the bypass line with the pressure drop and compression recovery device 605. A second bypass line valve 669 and third bypass line valve 671 are located on the bypass line. The second bypass line valve 669 and third bypass line valve 671 control fluid passage from the bypass line through just the main line or also the bypass line. After the flow exits the compression recovery device 605 a third bypass line valve 685 controls flow from the compression recovery device 605 into the mainline and out of the outlet 690.

The second mainline valve 670 can close to direct more or all fluid through the bypass line or isolate the primary pressure control valve 675 for maintenance. Primary pressure control valve 675 is controlled by the electric motor 642 mentioned above. Third mainline valve 680 can be used to further isolate the primary pressure control valve 675 for maintenance.

Outlet 690 ends the diagram of the exemplary system 601. The outlet 690 has lower pressure than the inlet 660. In an embodiment, fluid/gas at the inlet 660 has a flow of 500 mcf/day in flow. For example, at 500 mcf/day on a typical pipeline, the pressure at the outlet 690 will be about 100 PSIG (pounds per square inch gauge) and pressure will be about 200 PSIG at the inlet 660. Pressure loss through the turbine (or pressure differential measured at the inlet and outlet) may be, for example, in various embodiments, 25% to 90%, such as 40% to 70%, or 45% to 55%.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A compression recovery device for use in a pipeline system comprising:
   an inlet configured for coupling to a first pipeline of the pipeline system and an outlet configured for coupling to a second pipeline of the pipeline system;
   a turbine including turbine blades;
   a turbo housing coupled to the inlet and the outlet and comprising a hollow passage configured to route fluid flow to a side of an axis about which the turbine blades of the turbine spin;
   the turbine coupled to an alternator through one or more couplings that extend away from the first and second pipeline, the alternator configured to output electricity upon spinning of the turbine blades caused by flow of fluid through the first and second pipeline;
   wherein a bypass pipe is coupled at or downstream of the outlet and the bypass pipe is coupled to an upper housing that covers the alternator and an air-tight outer housing covers the upper housing.

2. The compression recovery device of claim 1, wherein the compression recovery device is configured for use in a pipeline substation, wherein the substation is a facility configured to reduce gas pressure in the pipeline system and or distribute gas into additional gas pipelines.

3. The compression recovery device of claim 1, wherein the device is configured to provide electric power for a sensor or motor associated with the pipeline system.

4. The compression recovery device of claim 1, wherein the inlet and the outlet have a diameter of 4 inches or less.

5. The compression recovery device of claim 1, further comprising an air-tight outer housing covering at least the turbo housing.

6. The compression recovery device of claim 1, wherein no magnetic flux extends into the turbo housing or on the turbine.

7. The compression recovery device of claim 1, wherein the one or more couplings comprise a planetary gear reduction assembly that reduces an rpm input from the turbine to the alternator in a ratio of 2 to 10.

8. The compression recovery device of claim 1, further comprising a housing that is air-tight over all the compression recovery device;
   wherein the device is configured for use with hydrocarbon gas flowing through the first and second pipeline, inlet, outlet, and turbo housing.

9. The compression recovery device of claim 1, wherein the one or more couplings extend the alternator away from the inlet, outlet, and hollow passage such that no magnetic flux from the alternator extends into the hollow passage or exerts on the turbine.

10. The compression recovery device of claim 1, wherein the device is configured for use with hydrocarbon gas flowing through the first and second pipeline, inlet, outlet, and turbo housing.

11. A pipeline system for transporting hydrocarbon gas comprising:
a compression recovery device comprising:
an inlet configured for coupling to an upstream pipeline of the pipeline system and an outlet configured for coupling to a downstream pipeline of the pipeline system;
a turbine including turbine blades;
a turbo housing coupled to the inlet and the outlet and comprising a hollow passage configured to route fluid flow to a side of an axis about which the turbine blades of the turbine spin;
the turbine coupled to an alternator through one or more couplings that extend above and away from the pipeline system, the alternator configured to output electricity upon spinning of the turbine blades caused by flow of fluid through the pipeline system;
an electric powered device coupled to the compression recovery device;
an air-tight outer housing covering the compression recovery device; and
a remote substation that is not coupled to an electrical grid;
wherein the compression recovery device is coupled to the pipeline system at the substation where pressure is dropped from the upstream pipeline to the downstream pipeline.

12. The pipeline system of claim 11, wherein the device is configured to provide electric power for the electric powered device and the electric powered device is a sensor or motor associated with the pipeline system.

13. The pipeline system of claim 11, wherein the compression recovery device is coupled to the pipeline system in a location that is more than 100 feet from an electric grid power line.

14. The pipeline system of claim 11, further comprising:
a substation and
the electric device is an electric motor that is configured to control a primary pressure control valve coupled to the pipeline system; wherein the pressure control valve regulates hydrocarbon gas pressure to provide sufficient flow to the compression recovery device to provide sufficient electric power to the substation and provide remaining hydrocarbon gas flow to other pipelines.

15. The pipeline system of claim 11 wherein the device is configured for use with hydrocarbon gas flowing through the upstream and downstream pipeline, inlet, outlet, and turbo housing.

16. A method of generating electric power at a remote pipeline location, comprising the steps of:
spinning a turbine of a compression recovery device with fluid flow through a turbo housing;
converting the spinning of the turbine to electrical power without causing an eddy current acting on the turbo housing;
sending the electrical power to power one or more devices selected from: a sensor, a motor to power a valve opening and closing, a pre-heater, or computing equipment;
wherein the fluid is a gas hydrocarbon;
wherein an air-tight outer housing covers the compression recovery device; and
the remote pipeline location is not coupled to an electrical grid;
wherein the compression recovery device is coupled to a pipeline at the remote pipeline location; and pressure is dropped from an upstream pipeline to a downstream pipeline at the remote pipeline location.

17. The method of claim 16, further comprising circulating cooler fluid at an outlet, resulting from a pressure drop, to cool an alternator or other components associated with converting the spinning of the turbine to electrical power.

18. The method of claim 16, wherein the remote pipeline location receives no power from an electric grid power line.

19. The method of claim 16, wherein electric power generated from the spinning of the turbine is 1 kilowatt to 50 kilowatts.

20. The method of claim 16, wherein no magnetic flux extends into the turbo housing or on the turbine.

* * * * *